United States Patent [19]

Cochran

[11] 4,096,765
[45] Jun. 27, 1978

[54] CONTROL LINKAGE ARRANGEMENT

[75] Inventor: Thomas E. Cochran, Yorkville, Ill.

[73] Assignee: Caterpillar Tractor Co., Peoria, Ill.

[21] Appl. No.: 772,802

[22] Filed: Feb. 28, 1977

[51] Int. Cl.² ............................................. G05G 11/00
[52] U.S. Cl. .................................. 74/473 R; 74/479;
74/483 K; 74/522
[58] Field of Search ................. 74/473 R, 479, 480 R,
74/481, 482, 483 K, 522

[56] References Cited

U.S. PATENT DOCUMENTS

| 2,908,183 | 10/1959 | Giovanni | 74/522 X |
|---|---|---|---|
| 2,940,332 | 6/1960 | Teague, Jr. | 74/522 |
| 3,910,133 | 10/1975 | Oestmann | 74/479 |

*Primary Examiner*—Allan D. Herrmann
*Attorney, Agent, or Firm*—Wegner, Stellman, McCord, Wiles & Wood

[57] ABSTRACT

A control linkage arrangement for use in a vehicle drive. The drive includes a speed control apparatus having a movable control element for causing the speed of the drive to vary in accordance with the positioning of the control element. Manual control of the operation of the vehicle is effected by an adjustment of a manually operable speed lever which is connected to the movable control element by an improved linkage arrangement. The linkage arrangement includes a ball connector received in a guide channel for effecting rotation of a pivot member connected to the speed control means. Selective positioning of the ball connector in the guide channel effects selective movement of the pivot member in either of opposite directions of rotation and to an extent controlled by the movement of the manually operable speed lever. The ball connector is connected to the speed lever by an extensible device and a range control is provided for varying the extension thereof so as to adjust the disposition of the guide channel relative to a pivot axis of the speed lever to correspondingly vary the effect of the speed lever movement relative to the amount of speed control effected by the device. A lock may be provided for selectively locking the device with the guide channel aligned with the pivot axis of the speed lever so as to preclude operation of the drive notwithstanding a pivoting operation of the speed lever.

27 Claims, 6 Drawing Figures

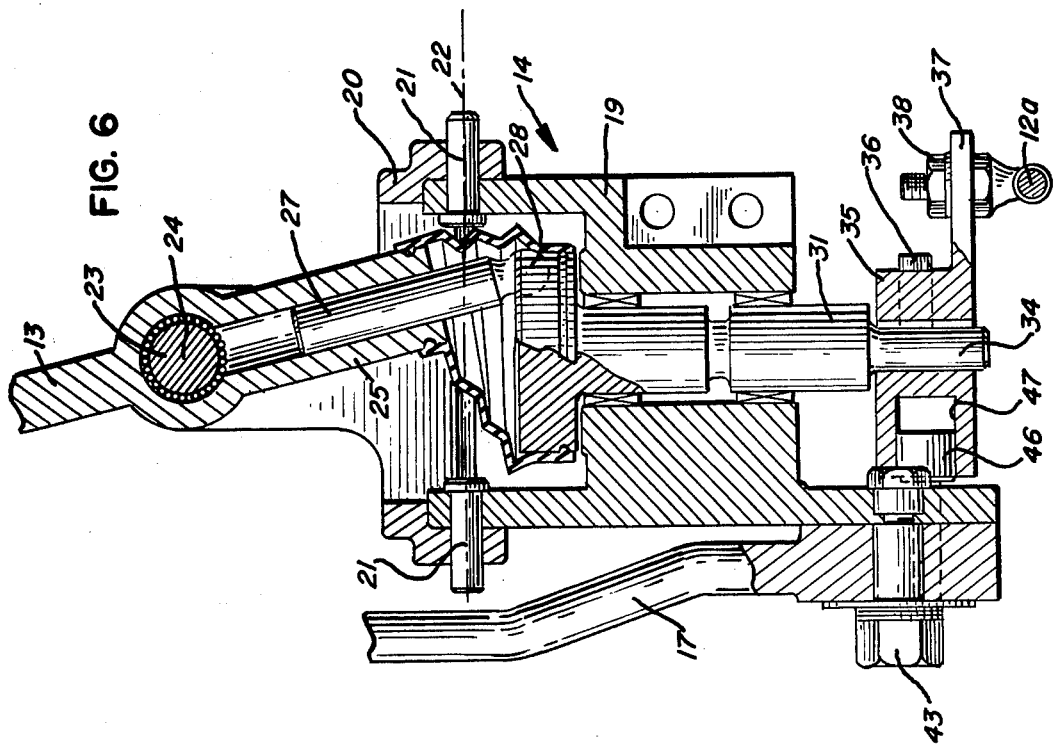
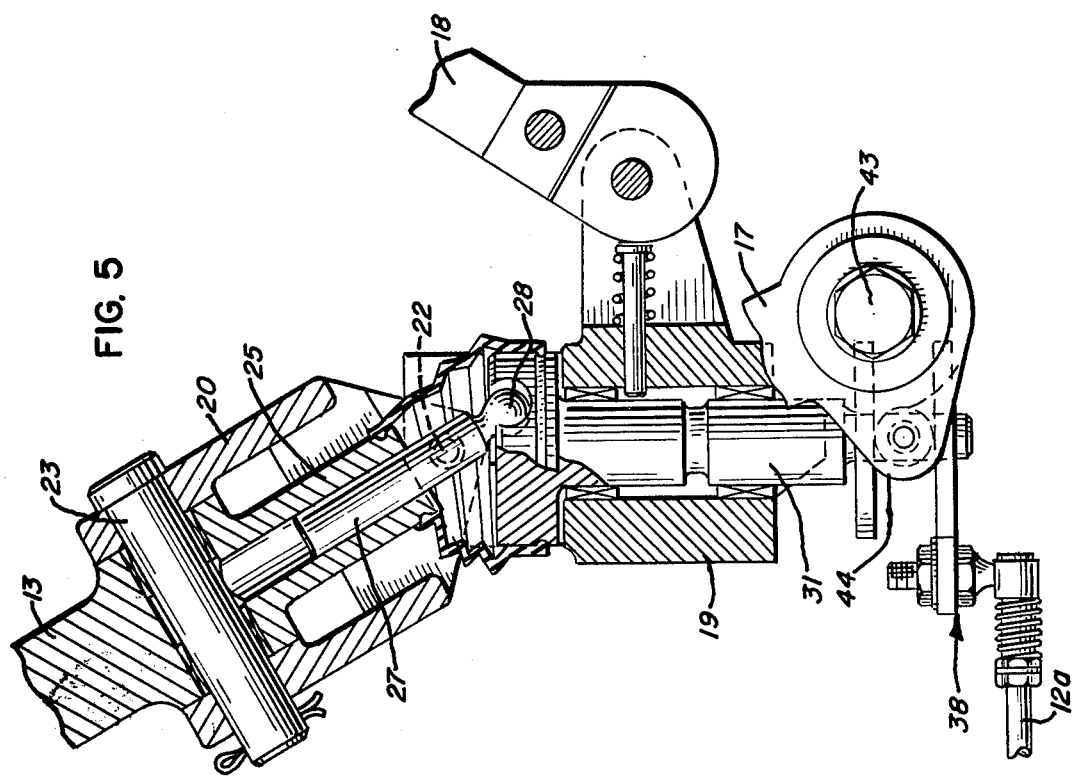

CONTROL LINKAGE ARRANGEMENT

BACKGROUND OF THE INVENTION

1. Field of the Invention

This invention relates to vehicle drives and in particular to means for controlling the speed and direction of operation of reversible vehicle drives. 2. Description of the Prior Art In copending application for U.S. Letters Patent, Ser. No. 754,296, filed Dec. 27, 1976, of Stamos I. Papasideris, which application is owned by the assignee hereof, an improved control for controlling the operation of a vehicle drive was disclosed for providing a variable amount of movement of a control element selectively in either of reverse or forward directions. Manual control of the drive was effected by a speed lever movable in a U-shaped path to provide a neutral operation of the drive when the speed lever was in a bight portion of the path and a variable speed operation of the drive when the speed lever was moved selectively outwardly along either of the legs of the U-shaped path, with the drive operating the vehicle in a forward direction when the speed lever was in one of the legs and in a reverse direction when the speed lever was in the other of the legs.

The drive control further included a manually operable range selector lever, means connecting the speed lever and the control element for moving the control element as a function of movement of the speed lever, and adjusting means connected to the range selector lever for causing the amount of movement of the control element by movement of the speed lever to be selectively varied.

SUMMARY OF THE INVENTION

The present invention comprehends a further improved means for interconnecting a manually operable speed lever and a movable control element of a drive speed control means.

More specifically, the present invention comprehends such an improved interconnecting means having a pivot member, means for mounting the pivot member for pivoting about a third, fixed pivot axis intersecting a first pivot axis, means connecting the pivot member to the control element to position the control element as a function of the pivotal position of the pivot member about the third pivot axis, a ball connector, a guide carried by the pivot member defining a channel spaced from the first pivot axis, the channel transversely intersecting the third pivot axis and slidably retaining the ball connector, and extensible means connecting the ball connector to the speed lever for movement therewith about the first and second pivot axes, movement of the speed lever about the second axis causing the extensible connecting means to move the ball connector in the guide channel from the third axis to an operating position spaced from the third axis, and movement of the speed lever about the first pivot axis causing the extensible connecting means to move the ball connector disposed in the operating postion arcuately about the third pivot axis to swing the control lever to an extent corresponding to the amount of pivoting of the speed lever about the first axis.

Further more specifically, the interconnecting means may be utilized in conjunction with a reversible vehicle drive, and for such purposes, the structure is arranged so that movement of the speed lever about the second axis causes the extensible connecting means to move the ball connector in the guide channel selectively from the third axis to opposite operating positions spaced oppositely from the third axis, and movement of the speed lever about the first pivot axis causing the extensible connecting means to move the ball connector disposed in an operating position arcuately about the third pivot axis to swing the control lever in a first rotational direction and to an extent corresponding to the amount of the speed lever about the first axis when the ball connector is disposed in a first operating position, and swing the control lever in a second, opposite rotational direction and to an extent corresponding to the amount of pivoting of the speed lever about the second axis when the ball connector is disposed is disposed in a second, opposite operating position.

The present invention further comprehends the provision in such a speed control device of range control means for selectively adjusting the disposition of the guide relative to the first pivot axis to adjust correspondingly the movement of the control element effected by movement of the speed lever.

Still further, the invention comprehends improved means for locking the interconnecting means in an arraangement precluding operation of the drive notwithstanding a movement of the speed lever. In the illustrated embodiment, the locking means effects such control by locking the guide with the channel aligned with the first pivot axis whereby pivotal movement of the speed lever effects no corresponding movement of the pivot member.

In the illustrated embodiment, the range control means includes a manually operable lever and means responsive to pivoting of the lever to move the pivot member axially.

Further in the illustrated embodiment, the means for connecting the pivot member to the speed control means comprises a portion of the range control means.

In the illustrated embodiment, the device is provided with a base member with the different elements of the device being mounted thereto to provide a simplified low cost and compact structure providing the highly desirable features discussed above.

BRIEF DESCRIPTION OF THE DRAWING

Other features and advantages of the invention will be apparent from the following description taken in connection with the accompanying drawing wherein:

FIG. 5 is a fragmentary vertical section illustrating the arrangement of the interconnecting means as during a speed control operation; and FIG. 6 is a fragmentary vertical section taken transversely to that of FIG. 5.

DESCRIPTION OF THE PREFERRED EMBODIMENT

Figure 1:
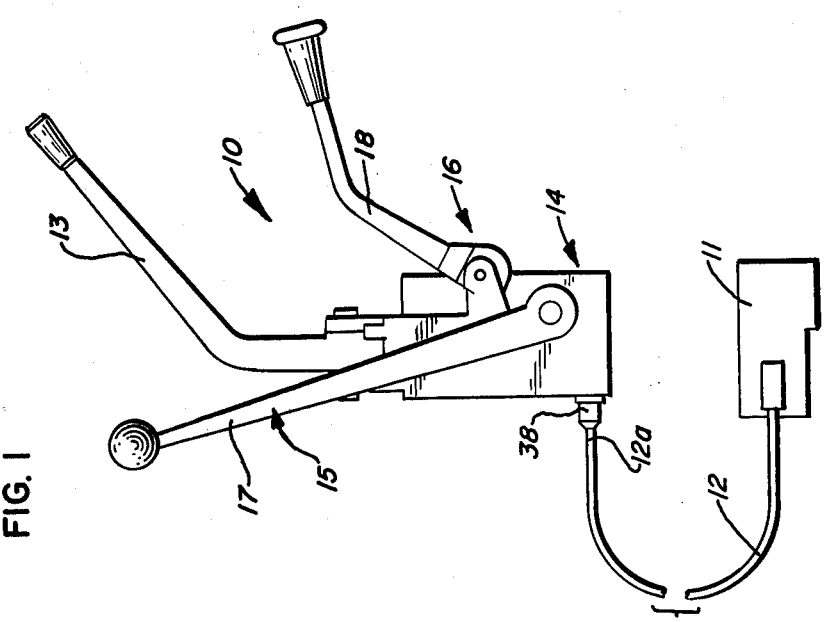
FIG. 1 is a side elevation of a vehicle drive control embodying the invention.

In the exemplary embodiment of the invention as disclosed in the drawing, a vehicle drive control generally designated 10 is shown to include a hydrostatic transmission means generally designated 11 of conventional construction. Selective operation of the transmission means is effected by a control cable 12 which operates the transmission means to provide a reversible drive of a vehicle or the like as a function of the direction and amount of displacement of the cable from a center position. Illustratively, speed controlled forward movement of the drive may be effected by suitably controlling the displacement of the cable 12 forwardly from a neutral position, and speed controlled reverse operation of the drive may be effected by controlled displacement of the cable rearwardly from the neutral position. To effect such displacement, the operator of the vehicle correspondingly controls a speed control lever 13 which is conventionally provided at a console adjacent the operator's seat.

The present invention includes an interconnecting means generally designated 14 which provides the desired control of cable 12 as a function of the selective positioning of the speed lever 13. Also associated with the interconnecting means 14 is a range control means generally designated 15 and a speed lockout means generally designated 16. The range control means 15 includes a range control lever 17 and the speed lockout means includes a speed lockout lever 18.

Briefly, the control 10 functions to provide the above discussed variable reversible control of the vehicle drive as a function of movement of the speed lever 13 with the range control means 15 selectively varying the effect of movement of the speed lever so as to provide a variable amount of speed control for a given amount of movement of the speed lever. The lockout means provides a selective control for locking the apparatus in a condition wherein the cable 12 is maintained in a neutral position notwithstanding movement of the lever 13 by the operator so as to provide a safety speed lockout function.

As shown in FIG. 6, the interconnecting means 14 includes a base member 19. Speed lever 13 is pivotally mounted to the base member by an intermediate support 20 which is pivotally mounted to the base member by suitable pivot pins 21 to provide pivoting of the support 20 about a first pivot axis 22.

Figure 2:
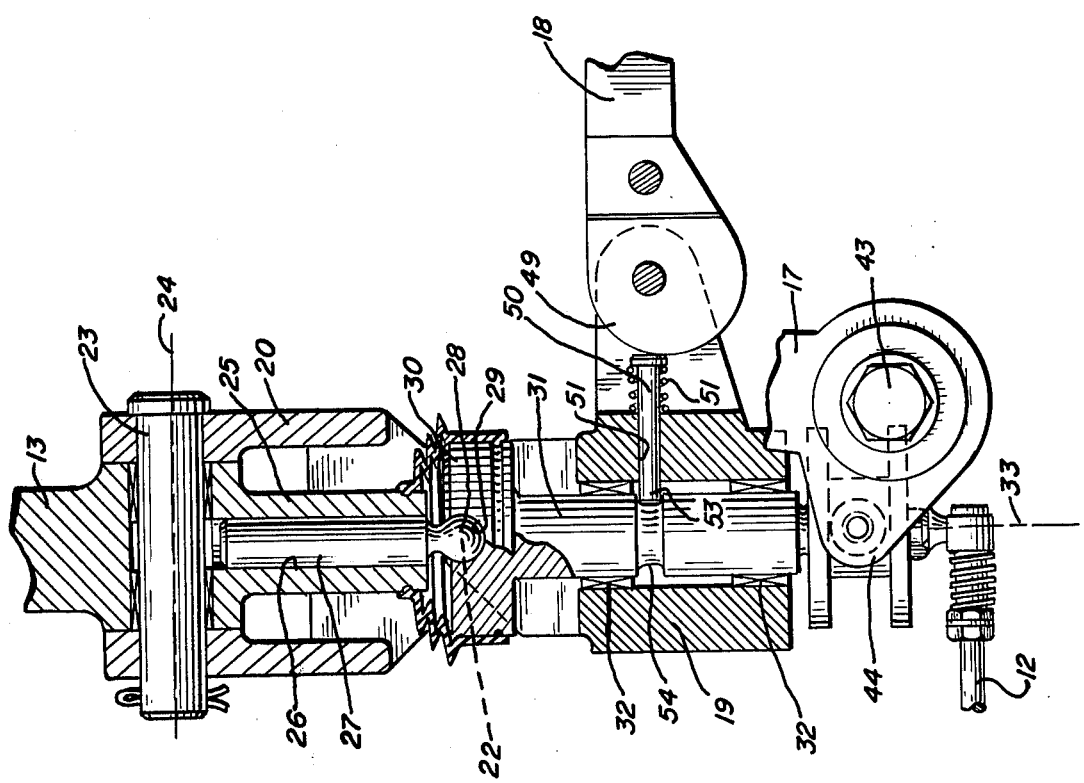
FIG. 2 is a fragmentary enlarged vertical section thereof with the interconnecting means arranged to preclude driving of the vehicle.

As shown in FIG. 2, speed lever 13 is pivotally mounted to the intermediate support 20 by a pivot pin 23 for pivoting of the lever 13 about a second pivot axis 24. As seen in FIGS. 2 and 6, the pivot axes 22 and 24 are transverse to each other and, thus, the connection of the speed lever 13 to the interconnecting means 14 provides a universal type connection wherein movement of the speed lever by the operator may be in mutually perpendicular directions. In the illustrated embodiment, movement of the speed lever 13 is intended to be in a U-shaped path with the speed lever being in a neutral position when disposed in the bight portion of the U-shaped path and providing variable reversible speed control when moved into either of the two opposite legs of the U-shaped path, movement into one of the legs providing variable forward speed control and movement into the other leg providing variable reverse speed control. Thus, the desired reversible speed control of the drive is effected by movement of the control lever by the operator in the same direction away from the bight portion of the U-shaped selectively at either end of the bight portion of the U-shaped path.

Figure 3:
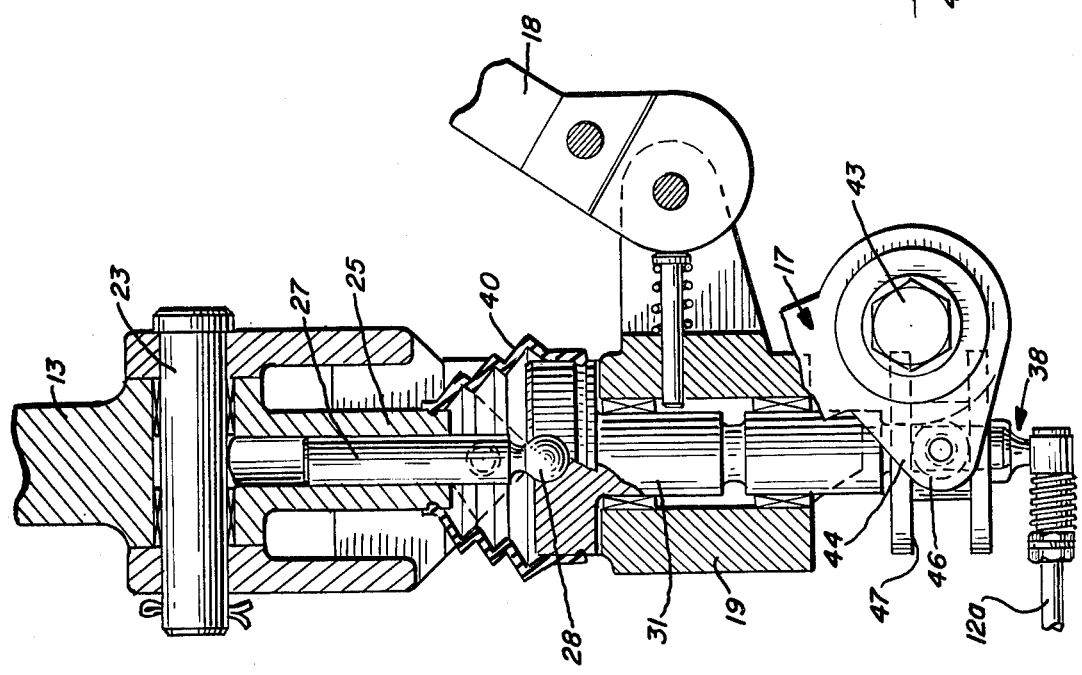
FIG. 3 is a vertical section illustrating the arrangement of the interconnecting means in a released condition.

More specifically, an increase in the speed of the drive is effected by movement of the speed lever 13 in a counterclockwise direction from the position of FIGS. 2 and 3 up to the maximum speed position of FIGS. 5 and 6.

As shown in FIG. 2, speed lever 13 includes a portion 25 inwardly of pivot pin 23 defining an axial bore 26 intersecting second pivot axis 24. Slidably receivable in bore 26 is a plunger 27 carrying at its lower end a ball connector 28.

Ball connector 28 is movably received in a channel 29 of a guide 30 carried on the upper end of a pivot member 31 which is rotatably mounted in base member 19 by a plurality of bearings 32. The pivot member comprises an elongated member, or shaft, which is thusly rotatably about its longitudinal axis 33 comprising a third pivot axis of the interconnecting means 14.

At its lower end, the pivot member is defined by a reduced portion 34 to which a connector member 35 is secured as by screw 36. The connector member includes a lever portion 37 to which end 12a of the cable 12 is secured as by threaded securing means 38.

Figure 4:
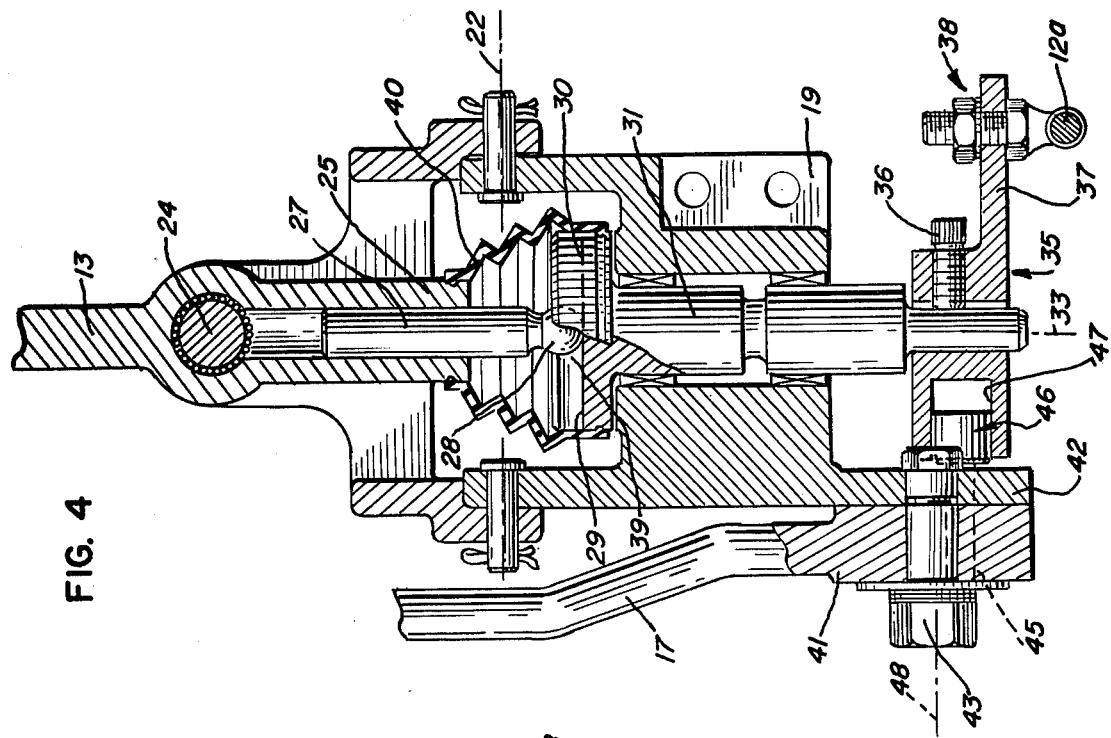
FIG. 4 is a vertical section transversely of the section of FIG. 3.

As illustrated in FIGS. 2 and 4, guide channel 29 extends transversely to third pivot axis 33 and substantially parallel to first pivot axis 22 when the ball connector 28 is disposed in the midportion 39 of the channel.

As further shown in FIGS. 2 and 4, the guide 30 and the lower end of plunger 27 with the ball connector 28 carried thereon, is enclosed in a collapsible housing 40 which extends between guide 30 and the lower end 25 of the speed lever 13. Thus, in effect, the connection of the speed lever to the guide is by an extensible means permitting retention of the ball connector 28 in the channel 29 notwithstanding a displacement of the pivot member 31 in the direction of axis 33, i.e. toward or from the first pivot axis 22.

As indicated briefly above, to obtain the desired adjustable reversible movement of cable 12 to effect the desired corresponding adjustable reversible speed control of the drive, the speed control lever 13 may be moved in a U-shaped path. As shown in FIG. 4, the speed control lever 13 is disposed at the center of the bight portion of the U-shaped path so that the ball connector 28 is disposed at the center of the channel 29 of guide 30. Movement of the speed control lever 13 to either of the opposite ends of the bight portion of the control path moves the ball connector 28 reversely correspondingly to either of the ends of the channel 29, i.e. radially away from the third pivot axis 33. Such displacement of the ball connector 28 is thusly effected by moving of the control lever pivotally about second pivot axis 24.

With the ball connector 28 disposed in such spaced relationship to the axis 33 at either end of the guide channel 29, pivotal movement of lever 13 about axis 22, such as in the counterclockwise direction from the disposition of FIG. 4 to the disposition of FIG. 6, causes a corresponding reverse movement of the ball connector 28, i.e. to the right as seen in FIG. 6, thereby correspondingly pivoting the pivot member 31 about axis 33 and correspondingly displacing control cable 12 connected thereto.

It may be readily seen that where the ball connector 28 is disposed at the righthand end of channel 29 as by a counterclockwise swinging of speed lever 13 about axis 24, subsequent swinging of the lever about axis 22 effects a clockwise rotation of the pivot member 31 (looking downwardly in FIG. 4) to provide a pushing action on cable 12. Reversely, pivoting of speed lever 13 in a clockwise direction about axis 24, as seen in FIG. 4, so as to dispose ball connector 28 at the lefthand end of channel 29, as seen therein, provides a pulling action on cable 12 when the speed control lever 13 is pivoted about axis 22, as shown in FIG. 5, as the forward movement of the ball connector 28 now effects a counterclockwise pivoting of the pivot member 31 about axis 33 as a result of such similar forward movement of the ball connector. Thus, depending on the selected disposition of ball connector 28 at either end of the channel 29, corresponding to the disposition of the speed lever at either end of the bight portion of the U-shaped path, permits a similar counterclockwise pivoting of the speed member as seen in FIG. 5, to effect selectively either a forward speed controlled operation of the vehicle drive or a reverse speed controlled operation of the vehicle drive with the speed being a direct function of the displacement of the speed lever angularly about the axis 22 in either of the two positions.

As discussed above, the invention further comprehends the provision of a range control means 15 for selectively varying the effect of movement of speed lever 13 so as to provide a greater or lesser amount of corresponding movement of cable 12. In the present embodiment, such range control is infinite and effected by suitable manipulation of the range control lever 17. As shown in FIG. 4, a lower end 41 of range control lever 17 is pivotally mounted to a depending flange 42 of base member 19 by suitable pivot bolt 43. Fixed to lever portion 41 for pivotal movement therewith is a lever 44 carrying at its distal end a post 45 which is provided in turn at its distal end with a wheel 46 movably received in a channel 47 in connector member 35.

Thus, as seen in FIGS. 2 and 3, swinging of range control lever 17 about the axis 48 of pivot bolt 43 effects the concurrent upward or downward movement of wheel 46 in channel 47 of connector member 35 which, as indicated above, is fixedly secured to the lower end of the pivot member 31. Resultingly, an upward or downward adjustment of the axis position of the pivot member 31, i.e. in the direction of axis 33, is effected. Resultingly, guide 30 carried on the upper end of the pivot member 31 is correspondingly displaced toward or from the first pivot axis 22 so as to bring ball connector 28 toward or from the pivot axis 22 and correspondingly effecting the amount of pivoting of pivot member 31 effected by a given angular movement of speed lever 13. As will be obvious to those skilled in the art, an upward displacement of ball connector 28 from the position of FIG. 4 to align the guide channel 29 with the first pivot axis 22, as seen in FIG. 2, prevents movement of cable 12 from the neutral position notwithstanding a pivotal movement of speed lever 13 about axis 22. All that happens under such conditions is that the ball connector 28 pivots in the channel 29 without effecting any clockwise or counterclockwise rotation of the pivot member 31. This is true whether the ball connector is disposed in the middle portion 39 of the channel or at either of the opposite ends.

As further indicated above, it is desirable at times to lock the connection means in such a disposition so as to prevent driving operation of the vehicle. In the present structure, such locking is effected by locking the pivot member 31 in the axis upper position of FIG. 2 wherein, as discussed above, no displacement of the cable 12 may be effected by movement of speed lever 13.

For this purpose, the speed lockout lever 18 is provided with a cam 49 engaging a lockout pin 50 which is biased outwardly through an opening 51 in the base member 19 by a suitable coil spring 52. The inner end 53 of lockout pin 50 is selectively received in a groove 54 in pivot member 31 to lock the pivot member against axial displacement, i.e. in the direction of third pivot axis 33.

When the lockout lever 18 is swung back to the release position of FIG. 1, cam 49 is spaced outwardly from base member 19 sufficiently to permit spring 52 to retract the lockout pin portion 53 from groove 54 and permit subsequent axial displacement of the pivot member for effecting desired positional control of cable 12, as discussed above.

Thus, the speed control means of the present invention may be seen to utilize an improved connecting means between a speed lever and a hydrostatic drive transmission cable which provides facilitated speed control as well as facilitated range control in a novel and simple manner. The connecting means is further arranged in a simple manner to provide a safety speed control lockout when desired.

The foregoing disclosure of specific embodiments is illustrative of the broad inventive concepts comprehended by the invention.

The embodiments of the invention in which an exclusive property or privilege is claimed are defined as follows:

1. In a vehicle drive having speed control means including a movable control element for causing the speed of the drive to vary in accordance with the positioning of said control element, and a manually operable speed lever mounted for selective positioning about mutually transverse first and second pivot axes, an improved connecting means interconnecting said speed lever and said control element for moving said control element as a function of pivotal movement of said speed lever, comprising:
   a pivot member;
   means for mounting said pivot member for pivoting about a third, fixed pivot axis intersecting said first pivot axis;
   means connecting said pivot member to said control element to position said control element as a function of the pivotal position of said pivot member about said third pivot axis;
   a ball connector;
   a guide carried by said pivot member defining a channel spaced from said first pivot axis, said channel transversely intersecting said third pivot axis and slidably retaining said ball container; and
   extensible means connecting said ball connector to said speed lever for mounting therewith about said first and second pivot axes, movement of said speed lever about said second pivot axis causing said extensible mounting means to move said ball connector in said guide channel from said third pivot axis to an operating position spaced from said third axis, and movement of said speed lever about said first pivot axis causing said extensible connecting means to move said ball connector disposed in said operating position arcuately about said third pivot axis to swing said control lever to an extent corresponding to the amount of pivoting of said speed lever about said first pivot axis.

2. The vehicle drive of claim 1 wherein said extensible means comprises cooperating slide and guide means.

3. The vehicle drive of claim 1 wherein said extensible means comprises cooperating slide and guide means defining an axis intersecting said first pivot axis.

4. The vehicle drive of claim 1 wherein said extensible means comprises cooperating slide and guide means defining an axis perpendicularly intersecting said first pivot axis when said ball connector is aligned with said third pivot axis.

5. The vehicle drive of claim 1 wherein said extensible means comprises means defining a guide recess movable with said speed lever, and a slide member carrying said ball connector slidably received in said recess.

6. The vehicle drive of claim 1 wherein said guide channel comprises an undercut channel slidably retaining said ball connector thereon.

7. The vehicle drive of claim 1 including a base member, means on said base member pivotally supporting said pivot member for pivoting about said third pivot axis, and means on said base member for pivotally supporting said speed lever for pivoting about said first pivot axis.

8. The vehicle drive of claim 1 including a base member, means on said base member pivotally supporting said pivot member for pivoting about said third pivot axis, means on said base member for pivotally supporting said speed lever for pivoting about said first pivot axis, means on said means for pivotally supporting said speed lever for pivoting about said first pivot axis and means for pivotally supporting said speed lever for pivoting about said second pivot axis.

9. The vehicle drive of claim 1 wherein means are provided for varying the extension of said extensible means to correspondingly vary the disposition of said ball connector relative to said first pivot axis.

10. In a reversible vehicle drive having speed control means including a movable control element for causing the speed and direction of the drive to vary in accordance with the positioning of said control element, and a manually operable speed lever mounted for selective positioning about mutually transverse first and second pivot axes, an improved connecting means interconnecting said speed lever and said control element for moving said control element as a function of pivotal movement of said speed lever, comprising:
a pivot member;
means for mounting said pivot member for pivoting about a third, fixed pivot axis intersecting said first pivot axis;
means connecting said pivot member to said control element to position said control said control element as a function of the pivotal position of said pivot member about said third pivot axis;
a ball connector;
a guide carried by said pivot member defining a channel spaced from said first pivot axis, said channel transversely intersecting said pivot axis and slidably retaining said ball connector; and
extensible means connecting said ball connector to said speed lever for mounting therewith about said first and second pivot axes, movement of said speed lever about said second pivot axis causing said extensible mounting means to move said ball connector in said guide channel selectively from said third pivot axis to opposite operating positions spaced oppositely from said third pivot axis, and movement of said speed lever about said first pivot causing said extensible connecting means to move said ball connector disposed in an operating position arcuately about said third pivot axis to swing said control lever in a first rotational direction and to an extent corresponding to the amount of pivoting of said speed lever about said first pivot axis when said ball connector is disposed in a first operating position, and swing said control lever in a second, opposite rotational direction and to an extent corresponding to the amount of pivoting of said speed lever about said second pivot axis when said ball connector is disposed in a second, opposite operating position.

11. The vehicle drive of claim 10 wherein said guide is rectilinear.

12. The vehicle drive of claim 10 wherein said ball connector is moved in a U-shaped path by the selective positioning of said speed lever about said first and second pivot axes.

13. The vehicle drive of claim 10 wherein said pivot member comprises a shaft, said guide being carried at one end of said shaft to project diametrically thereto.

14. The vehicle drive of claim 10 wherein said guide channel is selectively positionable in a direction perpendicular to said first pivot axis.

15. In a vehicle drive having speed control means including a movable control element for causing the speed of the drive to vary in accordance with the positioning of said control element, and a manually operable speed lever mounted for selective positioning about mutually transverse first and second pivot axes, an improved connecting means interconnecting said speed lever and said control element for moving said control element as a function of pivotal movement of said speed lever, comprising:
a pivot member;
means for mounting said pivot member for pivoting about a third, fixed pivot axis intersecting said first pivot axis;
means connecting said pivot member to said control element to position said control element as a function of the pivotal position of said pivot member about said third pivot axis;
a ball connector;
a guide carried by said pivot member defining a channel spaced from said first pivot axis, said channel transversely intersecting said third pivot axis and slidably retaining said ball container;
extensible means connecting said ball connector to said speed lever for mounting therewith about said first and second pivot axes, movement of said speed lever about said second pivot axis causing said extensible mounting means to move said ball connector in said guide channel from said third pivot axis to an operating position spaced from said third pivot axis, and movement of said speed lever about said first pivot axis causing said extensible connecting means to move said ball connector disposed in said operating position arcuately about said third pivot axis to swing said control lever to an extent corresponding to the amount of pivoting of said speed lever about said first pivot axis; and
range control means for selectively adjusting the disposition of the guide relative to said first pivot axis to adjust correspondingly the movement of the control element effected by movement of the speed lever.

16. The vehicle drive of claim 15 wherein said range control means comprises means for infintely adjusting said disposition of the guide.

17. The vehicle drive of claim 15 wherein said range control means comprises means for selectively aligning said channel with said first pivot axis to preclude movement of said control element by movement of said speed lever.

18. The vehicle drive of claim 15 wherein said range control means comprises means for selectively aligning said channel with said first pivot axis to preclude movement of said control element by movement of said speed lever, and locking means are provided for selectively retaining said guide in alignment with said first pivot axis.

19. The vehicle drive of claim 15 wherein said means for mounting said pivot member comprises a base member, said pivot member comprising an elongated element axially and rotatively mounted to said base member, and said range control means comprises a manually operable lever and displacement means operated by said lever to adjust the axial disposition of said pivot member.

20. The vehicle drive of claim 15 wherein said range control means comprises manually operable lever means.

21. The vehicle drive of claim 15 wherein said means for mounting said pivot member comprises a base member, said pivot member comprising an elongated element axially and rotatively mounted to said base member, said drive further including means for selectively locking said pivot member in a preselected adjusted position relative to said first pivot axis.

22. The vehicle drive of claim 15 wherein said means for mounting said pivot member comprises a base member, said pivot member comprising an elongated element axially and rotatively mounted to said base member, said drive further including means for selectively locking said pivot member in a preselected adjusted position relative to said first pivot axis comprising first shoulder means on said elongated element, and second shoulder means adjustably mounted adjacent said elongated element for selectively engaging said first shoulder means.

23. The vehicle drive of claim 15 wherein said means for mounting said pivot member comprises a base member, said pivot member comprising an elongated element axially and rotatively mounted to said base member, said drive further including means for selectively locking said pivot member in a preselected adjusted position relative to said first pivot axis comprising a recess in said elongated element, and shoulder means adjustably mounted adjacent said elongated element for selective reception in said recess.

24. The vehicle drive of claim 15 wherein said means for mounting said pivot member comprises a base member, said pivot member comprising an elongated element axially and rotatively mounted to said base member, said drive further including means for selectively locking said pivot member with said guide channel aligned with said first pivot axis to preclude movement of said control element by movement of said speed lever.

25. The vehicle drive of claim 15 wherein said means for mounting said pivot member comprises a base member, said pivot member comprising an elongated element axially and rotatively mounted to said base member, and said range control means comprises a manually operable lever pivotally mounted to said base member and displacement means operated by said lever to adjust the axial disposition of said pivot member.

26. The vehicle drive of claim 15 wherein said means connecting said pivot member to said control element comprises a portion of the range control means.

27. The vehicle drive of claim 15 wherein said range control means includes a connector member mounted to said pivot member and further defining said means for connecting said pivot member to said control means.

* * * * *

UNITED STATES PATENT AND TRADEMARK OFFICE
CERTIFICATE OF CORRECTION

PATENT NO. : 4,096,765
DATED : June 27, 1978
INVENTOR(S) : Thomas E. Cochran

It is certified that error appears in the above-identified patent and that said Letters Patent are hereby corrected as shown below:

Column 2, lines 23 and 24, correct "arraangement" to --arrangement--.

Column 4, line 12, after "thusly" cancel "rotatably" and substitute therefor --rotatable--.

Column 7, Claim 10, line 47, after "position" cancel "said control" (first occurrence);

line 53, after "said" insert --third--;

line 63, after "pivot" insert --axis--.

Column 9, Claim 19, line 12, after "member" cancel "comprising" and substitute therefor --comprises--.

Signed and Sealed this

Third Day of April 1979

[SEAL]

Attest:

RUTH C. MASON
Attesting Officer

DONALD W. BANNER
Commissioner of Patents and Trademarks